United States Patent
Anderson et al.

(10) Patent No.: US 10,007,875 B1
(45) Date of Patent: Jun. 26, 2018

(54) POINT-OF-SALE SECURITY ACTIVATION CARD

(71) Applicant: The Meyers Printing Companies, Inc., Minneapolis, MN (US)

(72) Inventors: Timm R. Anderson, Minneapolis, MN (US); Matthew J. Evers, Buffalo, MN (US); Bryce A. C. Loney, Blaine, MN (US); David P. McConnon, Big Lake, MN (US); Kent A. Madson, Eden Prairie, MN (US); Michael Charles Pollock, Bloomington, MN (US); Gregg R. Temple, Mendota Heights, MN (US); James R. Meis, Stillwater, MN (US)

(73) Assignee: The Meyers Printing Companies, Inc., Minneapolis, MN (US)

( * ) Notice: Subject to any disclaimer, the term of this patent is extended or adjusted under 35 U.S.C. 154(b) by 0 days. days.

(21) Appl. No.: 15/585,280

(22) Filed: May 3, 2017

Related U.S. Application Data

(60) Provisional application No. 62/331,124, filed on May 3, 2016.

(51) Int. Cl.
| | | |
|---|---|---|
| *G06K 5/00* | (2006.01) |
| *G06K 7/08* | (2006.01) |
| *G06K 19/10* | (2006.01) |
| G06K 19/06 | (2006.01) |
| G06Q 20/20 | (2012.01) |
| G06K 19/04 | (2006.01) |

(52) U.S. Cl.
CPC ........... *G06K 19/10* (2013.01); *G06K 19/042* (2013.01); *G06K 19/06028* (2013.01); *G06K 19/06187* (2013.01); *G06Q 20/206* (2013.01)

(58) Field of Classification Search
USPC ................................. 235/380, 382, 449, 493
See application file for complete search history.

(56) References Cited

U.S. PATENT DOCUMENTS 6,328,341 B2 * 12/2001 Klure .................. B42D 15/025
206/454
6,636,833 B1    10/2003 Flitcroft et al.
(Continued)

FOREIGN PATENT DOCUMENTS

EP              2226267 B1      8/2012

*Primary Examiner* — Tuyen K Vo
(74) *Attorney, Agent, or Firm* — Dicke, Billig & Czaja, PLLC

(57) ABSTRACT

A point-of-sale security activation card is provided. The card includes first and second card panels, a security element selectively interposed between the card panels, and machine readable content carried by either or both of the card panels. An inside panel surface of the first card panel is characterized by a revealable information field comprised of revealable information. The second card panel includes a tab, the tab overlying an end portion of the revealable information field of the first card panel. The security element includes a body, and a head extending therefrom. The head underlies the tab of the second card panel, the body overlying a substantial portion of the revealable information and intersecting with the machine readable content. Manipulation of the tab in furtherance of revealing the revealable information results in corruption of the machine readable content by the security element.

16 Claims, 6 Drawing Sheets

(56) References Cited

U.S. PATENT DOCUMENTS

| | | | |
|---|---|---|---|
| 6,758,404 B2 | 7/2004 | Ladyansky | |
| 7,537,168 B2 | 5/2009 | Anderson et al. | |
| 7,584,896 B2* | 9/2009 | Warther | G06K 19/06018 |
| | | | 235/380 |
| 8,033,473 B2 | 10/2011 | Britt et al. | |
| 8,157,086 B1* | 4/2012 | Gallegos | A45C 11/182 |
| | | | 206/232 |
| 8,718,603 B2 | 5/2014 | Wu et al. | |
| 8,720,786 B2 | 5/2014 | Boge et al. | |
| 8,931,639 B2 | 1/2015 | Payne | |
| 9,053,470 B2 | 6/2015 | Boge et al. | |
| 2002/0156683 A1 | 10/2002 | Stoutenburg et al. | |
| 2006/0255125 A1 | 11/2006 | Jennings, Jr. et al. | |
| 2007/0073619 A1 | 3/2007 | Smith | |
| 2007/0251995 A1* | 11/2007 | Kingsborough | B42D 15/045 |
| | | | 235/380 |
| 2009/0254480 A1 | 10/2009 | Esslinger et al. | |
| 2012/0145578 A1* | 6/2012 | Pazlar | B65D 73/0078 |
| | | | 206/459.5 |
| 2012/0256006 A1* | 10/2012 | Schmitt | B65D 75/28 |
| | | | 235/493 |
| 2012/0273576 A1 | 11/2012 | Tomczyk et al. | |
| 2015/0254549 A1* | 9/2015 | Newcombe | G06K 19/083 |
| | | | 235/493 |
| 2015/0269564 A1* | 9/2015 | Kearns | G06Q 20/354 |
| | | | 705/17 |

* cited by examiner

BACK PANEL - OUTSIDE VIEW

FRONT PANEL - OUTSIDE VIEW

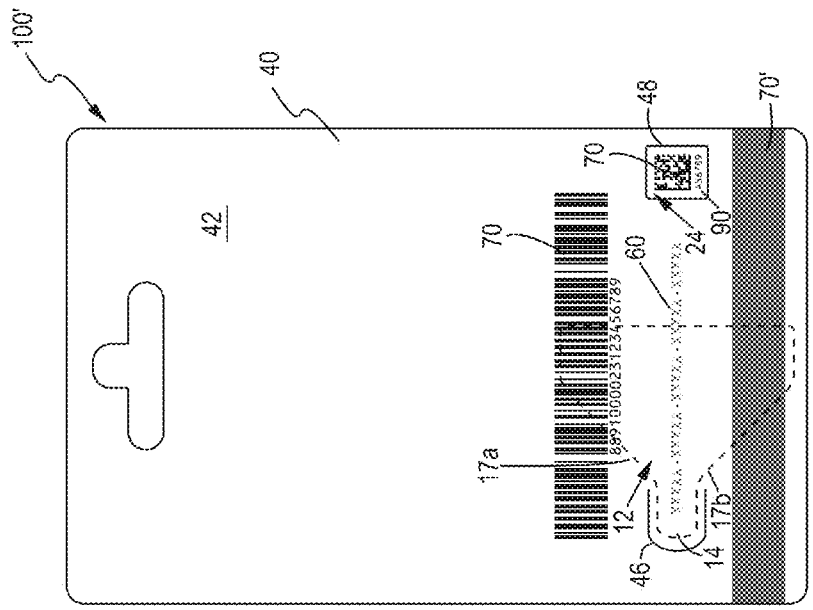
FIG. 6 BACK PANEL – OUTSIDE VIEW
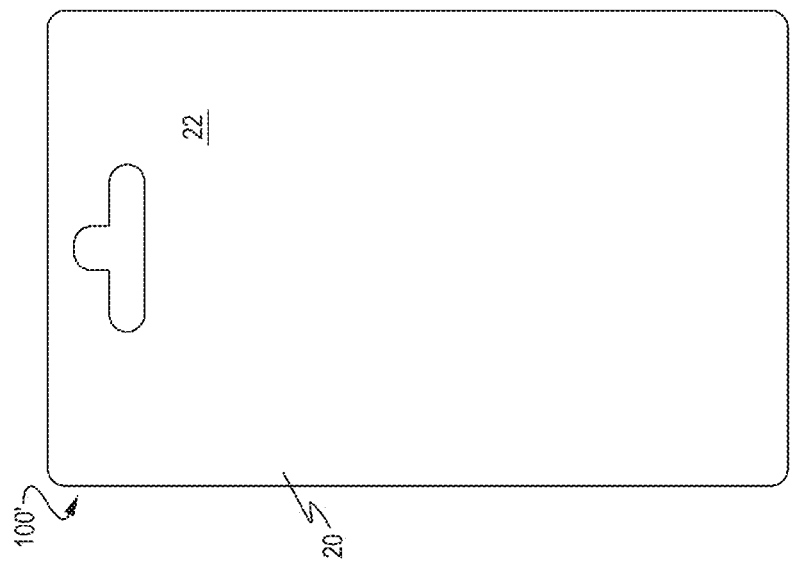
FIG. 5 FRONT PANEL – OUTSIDE VIEW

POINT-OF-SALE SECURITY ACTIVATION CARD

This is a United States national patent application filed pursuant to 35 USC § 111(a) claiming priority under 35 USC § 120 of/to U.S. Pat. Appl. Ser. No. 62/331,124 filed May 3, 2016 and entitled ANTI-SKIMMING PROMOTIONAL ASSEMBLY, the disclosure of which is hereby incorporated by reference in its entirety.

TECHNICAL FIELD

The present invention is generally directed to a promotional card assembly, more particularly, to a point-of-sale (POS) transaction card, and further still to a POS security activation card, and its manufacture, characterized by one or more features and/or a construction whereby "skimming" is defeated, more particularly, the instant disclosure is directed to means of/for corrupting a POS activation card owing to tampering or the like.

BACKGROUND

POS activation cards, e.g., those exemplified but hardly limited to those described/shown in U.S. Pat. No. 7,537,168 (Anderson et al.), are well known and popular mechanisms by which to "claim" a gift, promotion or premium. Various merchant cards (e.g., stored value cards) are commonly displayed in kiosks or the like for purchase and activation at retailers such as Target, Walgreens, CVS, etc. Notionally, in this setting, a purchaser will select a merchant card of designated nominal cash amount, or one capable of designating a purchaser select amount, and will thereafter proceed to "pay" at checkout, with the retailer "activating" the gift/premium which is later used, commonly by a third party who is more often than not a gift recipient of the activated card.

An alternate context for such cards is in connection to "access." For example and without limitation, subsequent to a card holder revealing a revealable "key," in the form of a revealable information (i.e., a "hidden" code such as an alpha/numeric stringer of the information field), the information/code may be used by the card holder to redeem or access a loyalty reward, premium, membership, subscription service, etc., or to access software or the like.

Skimming is a criminal activity whereby the access key of the POS activation card is obtained in advance of consumer purchase at the POS. The premium is quickly redeemed, not by the purchaser, but by the "skimmer" or their co-conspirators.

Two general approaches to POS activation fraud prevention are noted, namely, transactional steps to prevent or defeat activation fraud, and POS card adaptations towards that end. The instant disclosure is generally directed to the later approach.

Heretofore, prepaid card carriers and the like have been subject to numerous adaptations, ranging from photocopying prevention (see e.g., EP 2,226,267 (Abel)) to the inclusion of embedded microprocessors for biometric assessment and the like (see e.g., US Pub. No. 2007/0073619 (Smith)). Moreover, tamper evident cards characterized by thin panel package lamina or the like are generally known (see e.g., US Pub. No. 2012/0273576 (Tomczyk et al.) & U.S. Pat. No. 8,931,639 (Payne)). Further still, transaction cards characterized by security labels (i.e., a data field obstruction layer in the form of a hot stamped foil label) are also known (see e.g., U.S. Pat. Nos. 8,720,786 & 9,053,470 (Boge et al.)).

It is contemplated and believed advantageous and desirable to adapt known POS activation cards such that any operations executed upon the card (i.e., manipulation) in an effort to obtain the revealable, premium redemption data will corrupt the card, namely, the adaptation will operatively link or unite the information field of the revealable information to/with machine readable content, e.g., a bar code, magstripe, etc., in such a way that attempts to reveal the revealable information will corrupt the transaction means and thusly render it inoperable. Codes are protected, unauthorized code use eliminated and activation disabled when codes are accessed.

Via contemplated adaptations, the consumer and merchant cannot complete a sale/transaction with regard to a POS activation card of suspect integrity. Thus, while the card is essentially ready for the recycle bin, there has been no financial loss for either or both of the purchaser or/and the merchant.

SUMMARY OF THE INVENTION

A point-of-sale transaction/activation card is generally provided. More particularly, a POS security activation card assembly characterized by first and second card panels, a security element selectively interposed between the card panels, and machine readable content carried by either or both of the card panels is provided.

The first card panel has first and second surfaces, the first surface of the first card panel being an outside visible panel surface delimiting a first card face, the second surface of the first card panel being an inside panel surface. The inside panel surface is characterized by an information field comprised of information, the information field being a revealable information field, the information of the information field being revealable information.

The second card panel has first and second surfaces, the first surface of the second card panel being an outside visible panel surface delimiting a second card face, the second surface of the second card panel being an inside panel surface. The second card panel includes a tab, the tab overlying an end portion of the revealable information field of the inside panel surface of the first card panel, the machine readable content proximate the tab.

The security element includes a body and a head extending therefrom. The head underlies the tab of the second card panel, the body overlies a substantial portion of the revealable information field of the inside panel surface of the second surface of the first card panel and intersects the machine readable content. Manipulation of the tab of the second card panel, in furtherance of revealing the revealable information of the revealable information field, results in corruption of the machine readable content by the security element. In-as-much as the security element advantageously overlies a portion of the revealable information of the revealable information field, a portion of the security element may either overlie or underlie a portion of machine readable content, in its many forms/embodiments, in furtherance of corrupting reading of the machine readable content via disintegration of the tab and the operatively linked security element, from the assembly, more particularly, from portions of the assembly characterized by machine readable content. More specific features and advantages obtained in view of those features will become apparent with reference to the drawing figures and DETAILED DESCRIPTION OF THE PREFERRED EMBODIMENTS.

BRIEF DESCRIPTION OF THE DRAWINGS

Various other objects, features and attendant advantages of the contemplated POS security activation card assembly will become fully appreciated as the same becomes better understood when considered in conjunction with the accompanying drawings, namely FIGS. 1-8 in which like reference characters designate the same or similar parts throughout the several views, and wherein:

FIG. 5 depicts a further contemplated, non-limiting security activation card, more particularly, a first panel "front" (i.e., visible surface) view thereof;

FIG. 6 depicts an opposing view of the FIG. 5 security activation card, namely, a second panel "front" (i.e., visible surface) view thereof;

DESCRIPTION OF PREFERRED EMBODIMENTS

The subject description proceeds in connection to the representative, non-limiting illustrations of FIGS. 1-8 wherein first (FIG. 1 et seq.) and second (FIG. 5 et seq.) contemplated security activation/transaction card assembly embodiments are shown. It should be readily appreciated and understood that while a two-panel construct for the contemplated security activation card assembly is believed advantageous, it is not intended nor should it be in any way limiting. Moreover, while features of the illustrated and further contemplated security activation card assemblies may vary (e.g., location and number of visible information/information fields and/or position and nature of machine readable/detectable content carried or otherwise present in/with regard to the assembly), security activation card assembly elements (e.g., first and second card panels) may be readily adapted to carry, or otherwise include, visible and/or revealable information. Finally, the teachings of each of U.S. Pat. No. 7,537,168 & U.S. Pat. No. 8,720,786, previously cited, are incorporated herein by reference in their entireties.

Figure 2:
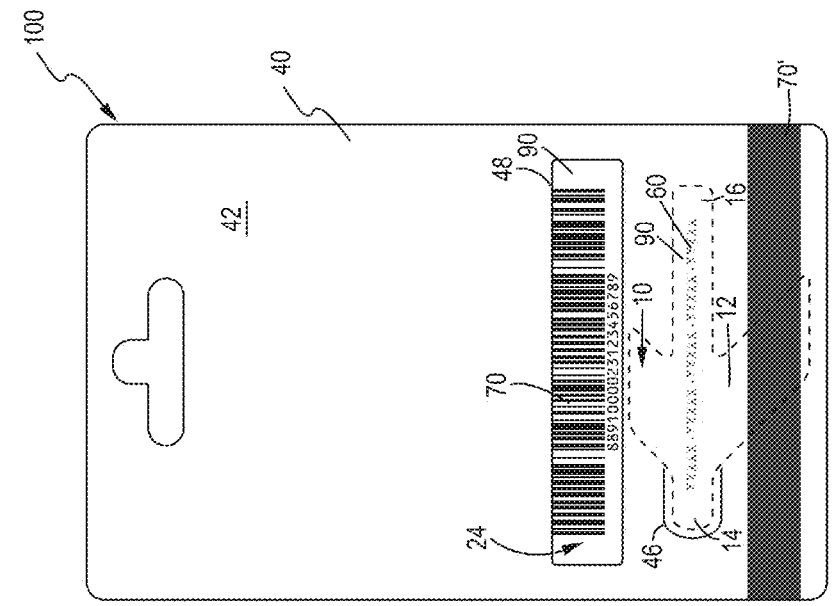
FIG. 2 depicts an opposing view of the FIG. 1 security activation card assembly, namely, a second panel "front" (i.e., visible surface) view thereof.
Figure 1:
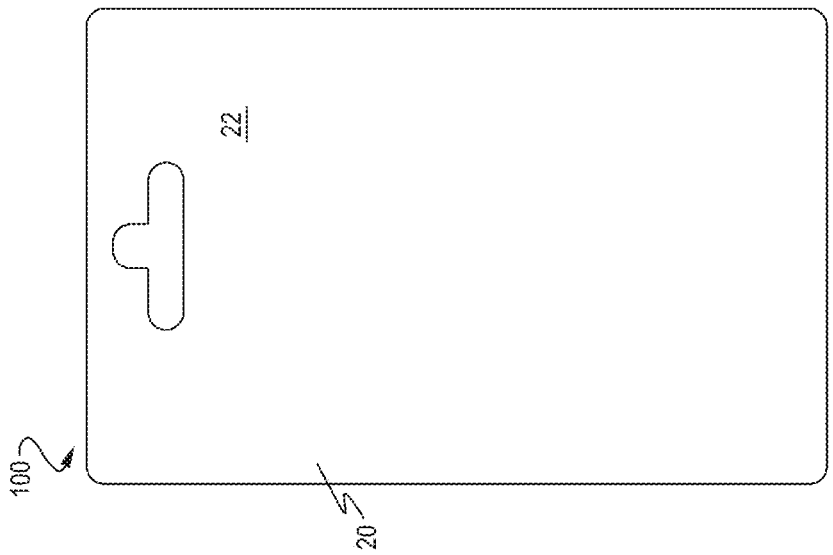
FIG. 1 depicts a contemplated, non-limiting security activation/transaction card assembly, more particularly, a first panel "front" (i.e., visible surface) view thereof.

The contemplated security activation/transaction card assemblies 100, 100' of FIGS. 1 & 5 are fairly and generally characterized by first 20, FIGS. 1 & 5, and second 40, FIGS. 2 & 6, panels (i.e., front (F) and back (B)) operatively united by an adhesive or the like (not indicated)). Both the front 20 and back 40 panels advantageously originate from a single sheet or web (i.e., material) which is processed so as to bear preselected printing on one or both opposing surfaces thereof, such processing greatly accelerating product fabrication while contributing to (i.e., permitting) limited batch production of "specialty" or limited edition print assemblies or products (see e.g., FIG. 2).

Figure 3:
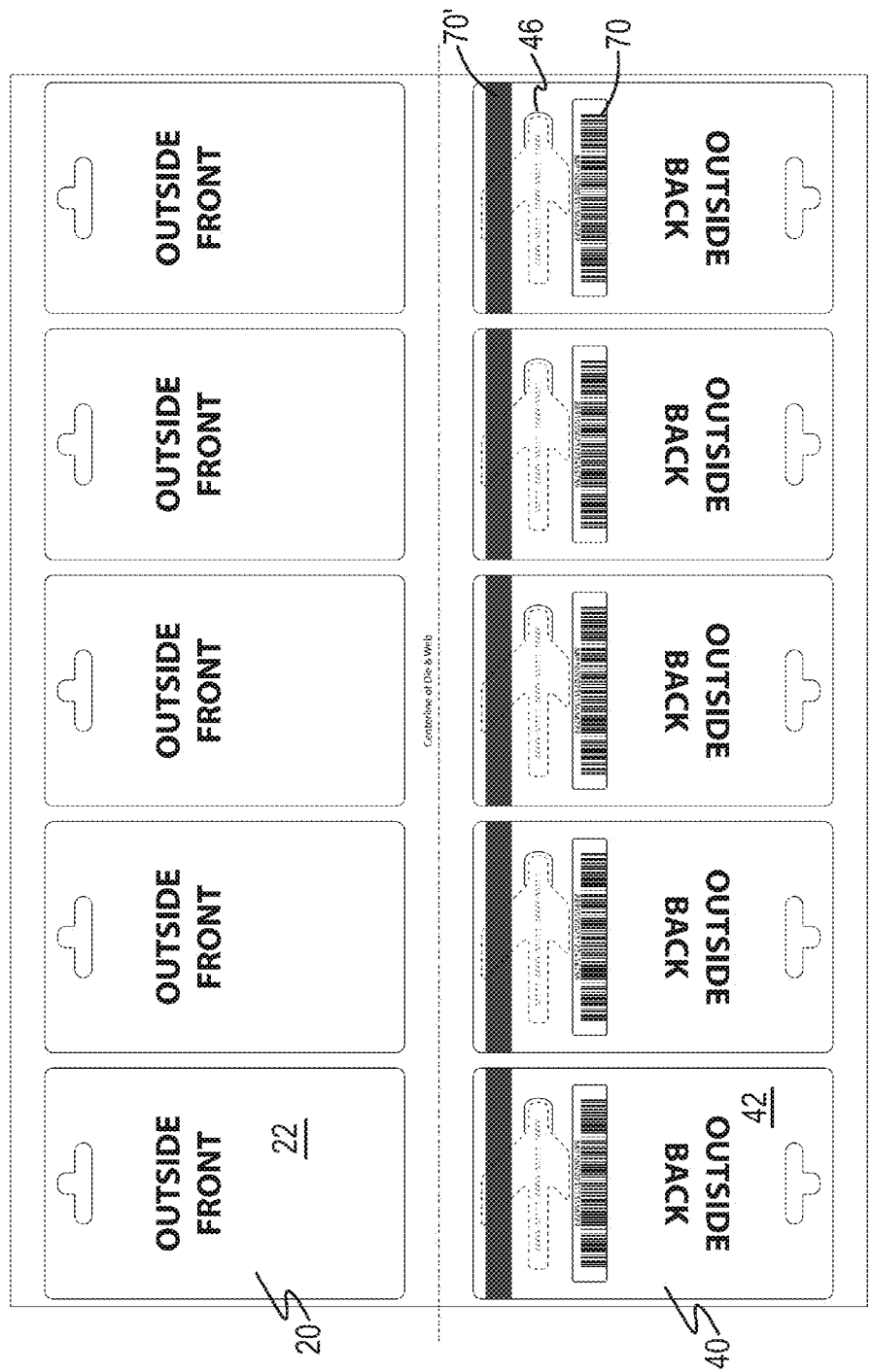
FIG. 3 depicts, full press sheet layout opposing visible surface views, panels of the security activation card assembly of FIG. 1, namely, an "outside back" (i.e., second panel rear surface visible) and an "outside front" (i.e., first panel front surface visible)
Figure 4:
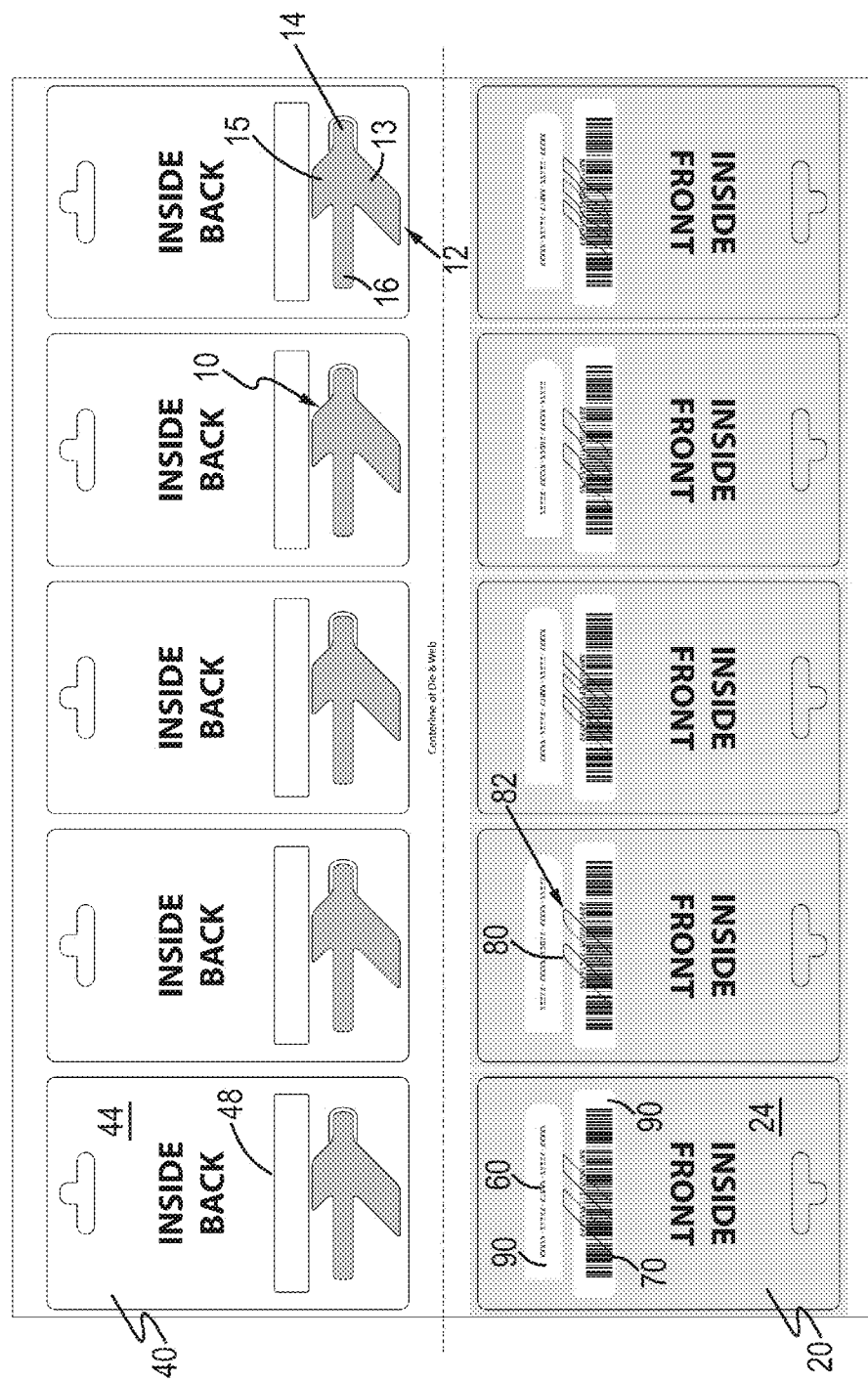
FIG. 4 depicts, full press sheet layout opposing non-visible surface views, panels of the security activation card assembly of FIG. 1, namely, an "inside front" (i.e., first panel rear surface visible) and an "inside back" (i.e., second panel rear surface visible)

Each panel 20, 40 possesses opposing sides (i.e., surfaces), namely, first 22, 42 and second 24, 44 surfaces, the first surface being a visible outside assembly surface (O), the second surface being a non-visible inside assembly surfaces (I). In the semantics of FIGS. 3 & 4 and/or FIGS. 7 & 8, "outside front" and "outside back" (FIGS. 3 & 7) correlate with first panel first (visible) surface 22, and second panel first (visible) surface 42; "inside back" and "inside front" (FIGS. 4 & 8) correlate with second panel second (non-visible) surface 44, and first panel second (non-visible) surface 24.

Advantageously, printed or otherwise applied content X and/or Y is carried by the inside view surface 24 of the front panel 20 (FIG. 4, lower half), namely, revealable information 60 in the form of an alpha-numeric string (i.e., a code), and machine readable content 70, for example, an optical label in the form of a bar code as shown. Alternatively, yet essentially, content X is carried by or otherwise present on the inside view surface 24 of the front panel 20 (FIG. 8), content X comprising or corresponding to the revealable content of the security transaction card assembly (i.e., the focal point or target of the "security"), with applied content Y alternately and suitably carried or otherwise present on the outside view surface 42 of the back panel 40 (FIG. 7, lower half) in contradistinction to the arrangement of the security transaction card assembly of FIG. 1, with further machine readable content 70', e.g., an alternate optical label in the form of a matrix bar code (i.e., a quick response (QR) code as shown), carried by or otherwise present on the inside view surface 24 of the front panel 20 (FIG. 8, lower half).

In connection to the security transaction card assembly of FIG. 1, a series of score lines 80 or the like are advantageously present upon the inside view face 24 of the front panel 20 so as to define spaced apart angularly oriented elongate areas (e.g., segments 82), the content Y overlying a first end portion of segments 82, the second end portions thereof extending to a margin of the content X field (i.e., the score segments/regions link the adjacent content fields 90 of the inside surface 24 of the front panel 20).

Figure 7:
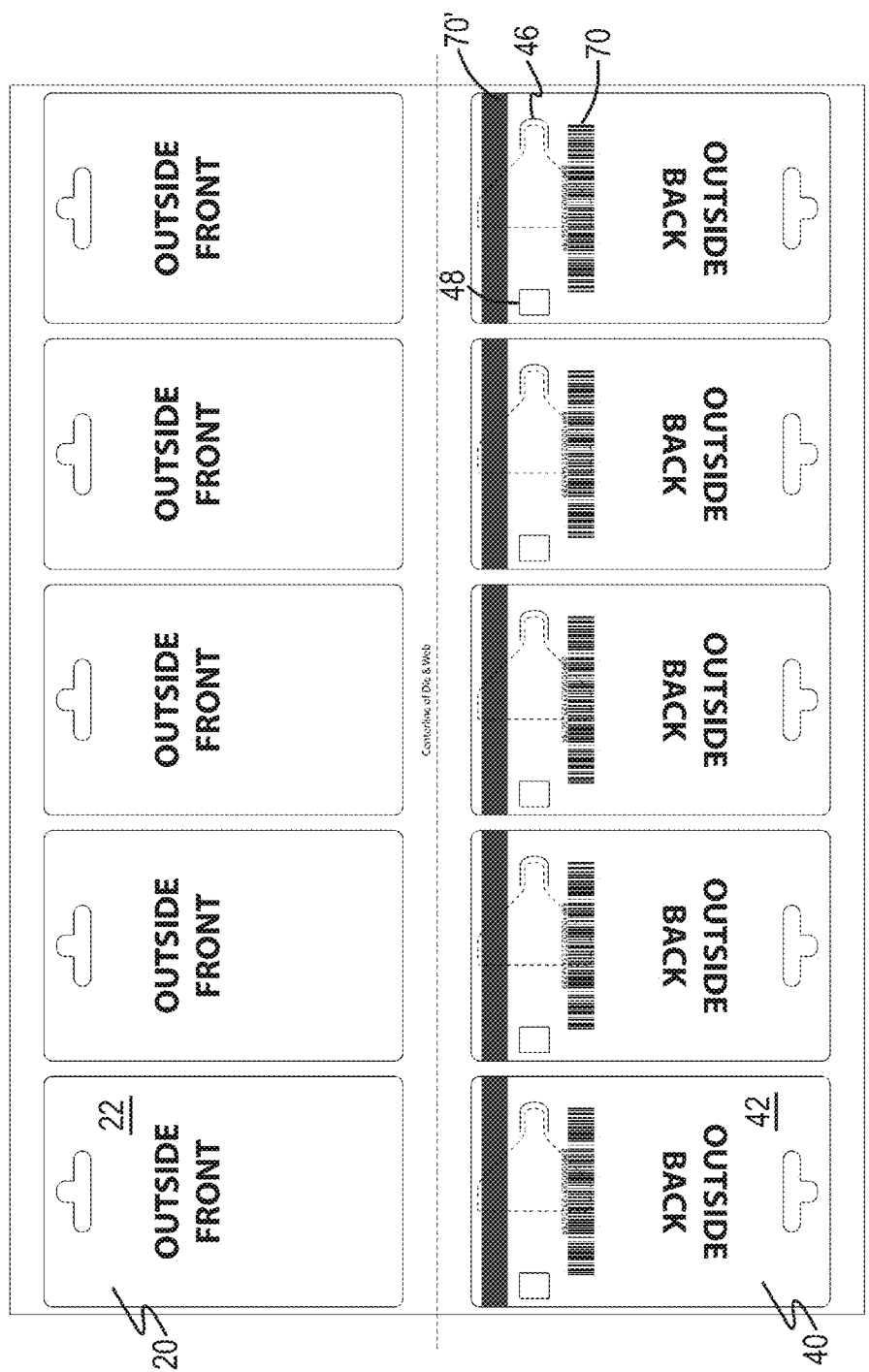
FIG. 7 depicts, full press sheet layout opposing visible surface views, panels of the security activation card assembly of FIG. 5, namely, an "outside back" (i.e., second panel rear surface visible) and an "outside front" (i.e., first panel front surface visible); and, FIG. 8 depicts, full press sheet layout opposing non-visible surface views, panels of the security activation card assembly of FIG. 5, namely, an "inside front" (i.e., first panel rear surface visible) and an "inside back" (i.e., second panel rear surface visible).
Figure 8:
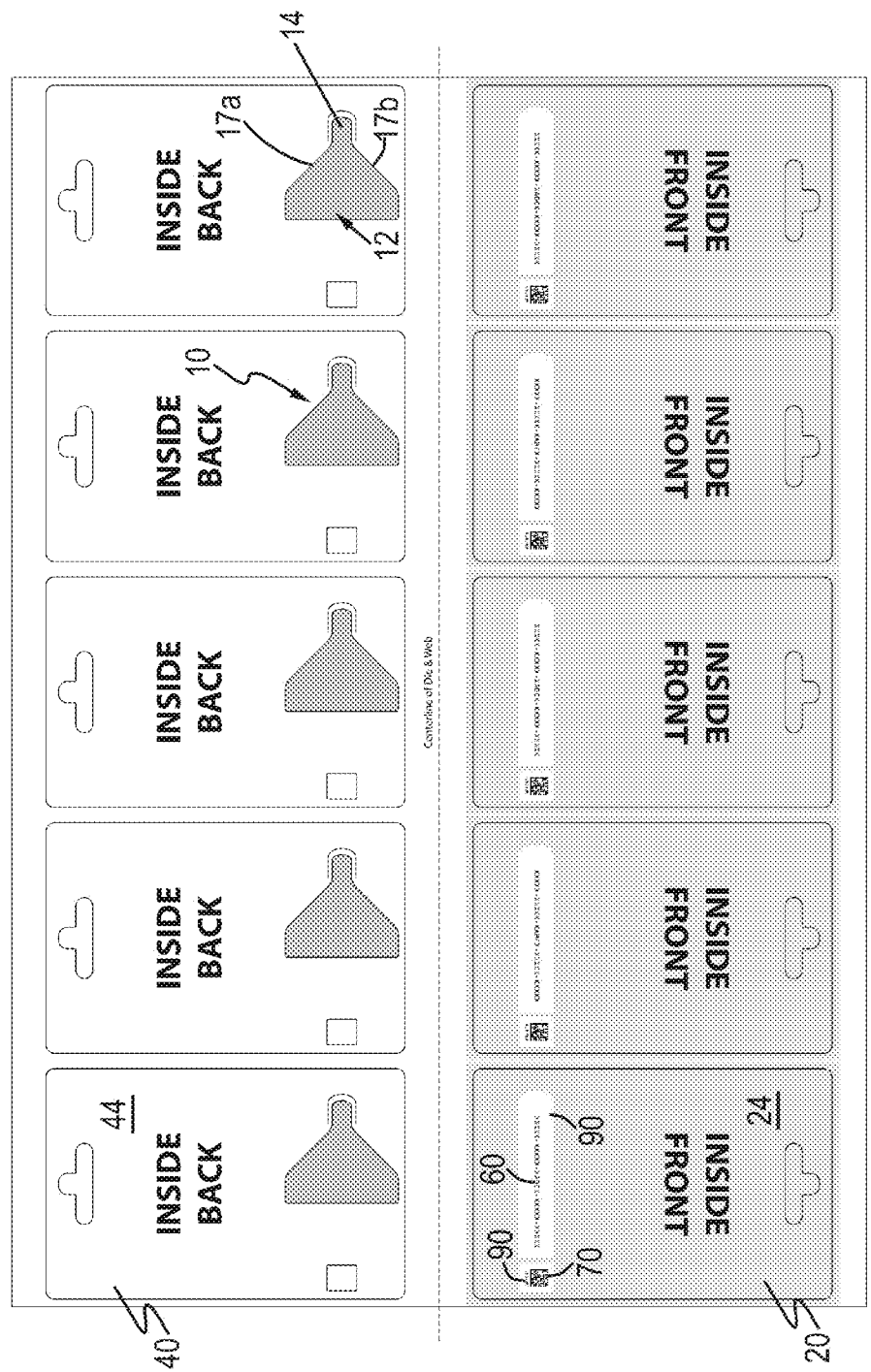

In relation to the front panel content or information, the back panel 40 includes corresponding portions X' and/or Y', one of which may be user manipulated so as to reveal the underlying content X and/or Y of the inside view surface 24 of the front panel 20 (FIGS. 3 & 7, lower half). As shown, a "C" shaped die cut or the like (FIGS. 2 & 6) delimits a tab, nose or finger hold 46 for user manipulation in furtherance of revealing underlying content (i.e., content X), with a cut-out 48 or the like provided in the second panel 40 of the card assembly 100 (FIG. 3, lower half) such that content Y is visible assembly content (as opposed to revealable content). As was previously noted, in lieu of a second card panel cut-out through which content Y is visible, the security transaction card assembly of FIG. 5 includes content Y on a visible card portion surface, i.e., machine readable content 70, e.g., an optical label in the form of a bar code as shown, is carried or otherwise present on the outside view surface 42 of the back panel 40.

Moreover, in addition to the inclusion of machine readable content in the form of an optical label on the outside view surface 42 of the back panel 40, the outside view surface 42 advantageously, but not necessarily, may further, or only, include machine readable content 70 in the form of an encoded magnetic strip (FIG. 3 or FIG. 7) applied thereto, more broadly, a machine-readable/detectable data field containing machine readable/detectable data. Further still, it is contemplated that the assembly readily be adapted to include transaction card characteristics and functionality, as for example via inclusion of such characteristic features such as, and without limitation, a radio frequency identification (RFID) or smart chip, for any of personal identification, authentication, data storage, and application processing, in the assembly per se, or vis-a-vis a subassembly, advantageously, a disintegratable subassembly (e.g., a transaction card separable from an auxiliary (i.e., promotional) member of the assembly as by a line-of-weakness or the like).

As is best seen and appreciated in connection to FIGS. 4 & 8, the inside surface 44 of the back panel 40 advantageously carries or is adapted to include a security element 10 which may be fairly characterized as having a body 12 and a head 14 extending therefrom. As will be subsequently developed in connection to the illustrated security transaction card assemblies of FIGS. 1 & 5, the body 12 laterally extends so as to underlie machine readable content, advantageously, the machine readable content necessary to effectuate the point-of-sale transaction. While the security element generally underlies a data storage element or device (e.g., a magstripe), the relationship between the security element and an optical label of the assembly is a function of how/where this further machine readable data is carried/positioned in the assembly. Advantageously, but not necessarily, the security element comprises a film, more particularly, a thermoplastic film such as a biaxially oriented polypropylene (BOPP), adhesively affixed to an inside panel surface of the second card panel.

With particular reference to FIGS. 2 & 4, the security element 10 is advantageously, but not necessarily, substantially coextensive with the information field 90 of the inside panel surface 24 of the first card panel 20, the element appearing as a stylized, non-symmetrical arrowhead, right pointing FIG. 4. The head 14 generally corresponds to/underlies the tab 46 of the second panel 40, a tail 16, opposite the head 14, extends from the security element body 12 so as to overlie the revealable information 60 of the revealable information field 90. The body 12 includes dominant 13 and subordinate portions 15.

The dominant body portion 13 of the security element 10 extends away from the head 14 and down towards and to the machine readable content 70 of the second card panel 40 (FIG. 4). More particularly, the dominant body portion 13 downwardly extends so as to at least underlyingly intersect, and preferably underlyingly traverse, the machine readable content 70 of the second card panel 40, namely, a magstripe as shown FIG. 3, intermediate its ends. Notionally, the dominant body portion need only extend to substantially underlie a portion of the magstripe, whether it is through its width, length or both.

The subordinate body portion 15 of the security element 10 extends away from the head 14 up towards the second panel cutout 48 (FIG. 4) through which the machine readable content 70 of the first card panel 20 is visible (FIG. 3). More particularly, the subordinate body portion 15 upwardly extends to affixedly overlie a lower portion of the score segments 82 of the second surface 24 of the first card panel 20. The upper portion the score segments 82 carry machine readable content segments, namely, optical label segments such as the bar code elements as per FIG. 4, lower half.

In furtherance of revealing revealable content X, the second panel tab, delimited by the "C" shaped die cut, is manipulated by pulling same to the right (FIG. 2). As the tab is manipulated, the security element is functionally engaged. As is best appreciated with reference to FIG. 4, as the tab 46 is retracted (to the left), pulling forces are transmitted to and through the security element 10, and thus to portions of the assembly elements over/underlying same, namely, segments of the magstripe, and spaced apart sections of the bar code (content Y) overlaying the angularly oriented elongate regions/segments 82 delimited by the front panel score lines/segments 80. Via such features/elements and the relationship/interrelationship, a reveal of the revealable code for all intents-and-purposes disables activation/"reading" of information of visible information fields.

With particular reference to FIGS. 6-8, the security element 10' of this activation card assembly appears as an on-end coat hanger (FIG. 8, upper half, head corresponding to "hook"). As with the earlier embodiment, the head 14' generally corresponds to/underlies the tab 46 of the second panel 40. The body 12', from which the head 14' extends, is characterized by shoulders (i.e., upper 17a and lower 17b as indicated FIG. 8) which symmetrically extend from an element centerline. The upper shoulder 17a extends up and away from the head 14' so as to underlie substantial portion of the machine readable content 70, namely, the optical label, more particularly, the bar code as shown (FIGS. 6 & 7). The lower shoulder 17b extends down and away from the head 14 so as to underlie a substantial portion of further machine readable content 70', namely, the data storage element, more particularly, the magstripe as shown (FIGS. 6 & 7).

Functionally, in furtherance of revealing revealable content X, the second panel tab, delimited by the "C" shaped die cut, is manipulated by pulling same to the right (FIG. 6). As the tab is manipulated, the security element is functionally engaged. As is best appreciated with reference to FIG. 6, as the tab 46 is retracted (to the right), pulling forces are transmitted to and through the security element 10' and thus to portions of the assembly elements overlying the shoulders thereof, namely, a portion or segment of the magstripe, and a portion or segment of the bar code. Via such features/elements and the relationship/interrelationship, a reveal of the revealable code for all intents-and-purposes disables activation/"reading" of information of visible information fields.

What has been described and illustrated herein are one or more preferred embodiments of the contemplated POS security transaction/activation card, along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

That which is claimed:
1. A point-of-sale activation card comprising:
 a. a first card panel having first and second surfaces, said first surface of said first card panel being an outside visible panel surface delimiting a first card face, said second surface of said first card panel being an inside panel surface, said inside panel surface characterized by an information field comprised of information, said information field being a revealable information field, said information of said information field being revealable information;

b. a second card panel having first and second surfaces, said first surface of said second card panel being an outside visible panel surface delimiting a second card face, said second surface of said second card panel being an inside panel surface, said second card panel including a tab, said tab overlying an end portion of said revealable information field of said inside panel surface of said first card panel;

c. machine readable content carried by either or both of said first or said second card panels;

d. a security element selectively interposed between said first card panel and said second card panel, said security element including a body and a head extending therefrom, said head underlying said tab of said second card panel, said body overlying a substantial portion of said revealable information field of said inside panel surface of said second surface of said first card panel and intersecting with said machine readable content, manipulation of said tab of said second card panel in furtherance of revealing said revealable information of said revealable information field resulting in corruption of said machine readable content by said security element.

2. The point-of-sale activation card of claim 1 wherein said security element is affixed to said inside panel surface of said second card panel.

3. The point-of-sale activation card of claim 1 wherein said security element is adhesively affixed to said inside panel surface of said second card panel.

4. The point-of-sale activation card of claim 1 wherein said machine readable content is adjacent to said tab.

5. The point-of-sale activation card of claim 1 wherein said machine readable content is spaced apart from said tab.

6. The point-of-sale activation card of claim 1 wherein said machine readable content is carried by said second surface of said first card panel.

7. The point-of-sale activation card of claim 1 wherein said machine readable content is carried by said first surface of said second card panel.

8. The point-of-sale activation card of claim 1 wherein said machine readable content is carried by said second surface of said first card panel and carried by said second surface of said first card panel.

9. The point-of-sale activation card of claim 1 wherein said machine readable content comprises an optical label.

10. The point-of-sale activation card of claim 1 wherein said machine readable content comprises an optical label, said optical label carried by said second surface of said first card panel.

11. The point-of-sale activation card of claim 1 wherein said machine readable content comprises an optical label, said optical label carried by said first surface of said second card panel.

12. The point-of-sale activation card of claim 1 wherein said machine readable content comprises a data storage element.

13. The point-of-sale activation card of claim 1 wherein said machine readable content comprises a data storage element, said data storage element carried by said first surface of said second card panel.

14. The point-of-sale activation card of claim 1 wherein said machine readable content comprises an optical label and a data storage element.

15. The point-of-sale activation card of claim 1 wherein said machine readable content comprises an optical label and a data storage element, said tab of said second card panel intermediate said optical label and said data storage element.

16. A point of sale activation card comprising:

a. a first card panel having first and second surfaces, said first surface of said first card panel being an outside visible panel surface delimiting a first card face, said second surface of said first card panel being an inside panel surface, said inside panel surface characterized by an information field comprised of information, said information field being a revealable information field, said information of said information field being revealable information;

b. a second card panel having first and second surfaces, said first surface of said second card panel being an outside visible panel surface delimiting a second card face, said second surface of said second card panel being an inside panel surface, said second card panel including a tab, said tab overlying an end portion of said revealable information field of said inside panel surface of said first card panel, said first surface of said second card panel adapted to include machine readable content, said machine readable content comprising an optical label and a data storage device, said tab intermediate said machine readable content; and, c. a security element selectively interposed between said first card panel and said second card panel, said security element including a body and a neck extending therefrom, said neck underlying said tab of said second card panel, said body overlying a substantial portion of said revealable information field of said inside panel surface of said second surface of said first card panel and intersecting with said machine readable content, manipulation of said tab of said second card panel in furtherance of revealing said revealable information of said revealable information field resulting in corruption of said machine readable content by said security element.

* * * * *